United States Patent [19]

Boulter

[11] 3,774,192

[45] Nov. 20, 1973

[54] DOCUMENT DETECTION DEVICE RESPONSIVE TO GAS STREAM PRESSURE CHANGES

[75] Inventor: David Gordon Boulter, Gamlingay, near Sandy, England

[73] Assignee: International Computers Limited, London, England

[22] Filed: Mar. 22, 1972

[21] Appl. No.: 236,902

[30] Foreign Application Priority Data

Apr. 28, 1971 Great Britain .................. 11,862/71

[52] U.S. Cl. .................. 340/259, 271/57, 340/280, 340/419

[51] Int. Cl. .................. G08b 21/00

[58] Field of Search .................. 340/259, 419, 222, 340/280; 271/57

[56] References Cited

UNITED STATES PATENTS 2,992,822 7/1961 Fraidenburgh .................. 271/57

R26,896 5/1970 Schmidlin et al. .................. 271/57

*Primary Examiner*—John W. Caldwell

*Assistant Examiner*—Glen R. Swann, III

*Attorney*—Hane, Baxley & Spiecens

[57] ABSTRACT

In apparatus for detecting the presence of documents on a document support surface, the surface has at least one groove extending from one end of the surface to the other end and aligning with the direction of document feed. The groove is closed at one end and open at the other. A flow of pressurized air is fed from the closed end lengthwise of the groove. A gas pressure dectection means monitors the gas pressure intermediate the ends of the groove and produces an output signal which has a first value when a document covers the groove and a second value when the document is not covering the groove.

8 Claims, 4 Drawing Figures

DOCUMENT DETECTION DEVICE RESPONSIVE TO GAS STREAM PRESSURE CHANGES

BACKGROUND OF THE INVENTION

This invention relates to devices for detecting documents.

THE PRIOR ART

It is known to detect or sort documents by feeding the documents singly and by pneumatic action along a transport track provided with a number of branches leading the receptacles for sorted documents being deflected into selected branches so that each document reaches the appropriate receptacle. A particular apparatus includes a container for documents such as cheques to be sorted which may, for example, be stacked on edge along one side of the container. Each document in turn is attracted to a pneumatic separator for feeding the cheques sigly along a transport rack. The separator is singly with a magnetic reader past which the cheques are fed in turn; the reader sensing command information carried by the cheques with respect to the catagories into which they are to be sorted. Along the sides of the track there is provided a number of gates controlled by the entry to branch tracks which lead to a number of recptacles correspond to the respective catagories into which it is desired to sort the cheques. The gates are opened and closed in response to the command information picked up from the cheques by the reader.

SUMMARIES OF THE INVENTION

According to the invention there is provided apparatus for detecting the presence of a document including a support surface for the document, means for producing a predetermined gas pressure condition at the surface for affecting the travel of the document relative to the support surface, and means responsive to the pressure condition for producing an output signal characteristic of the variation of said pressure condition between that prevailing with a document on the surface and that prevailing in the absence of a document.

According to a further aspect of the invention there is provided apparatus for detecting a document including a plate with a smooth document supporting surface; at least one linear slot in the surface of the plate, the slot being aligned in the direction of feed and being closed at one end and open at the other end; a first orifice adjacent to the closed end of the slot such that the application of pressurised gas to the orifice causes a stream of gas to flow along the slot; a second orifice in the slot intermediate the closed and open ends; a pressure detection means responsive to the gas pressure at the second orifice; and means controlled by said detection means to provide an indication of the presence of a document on the plate adjacent to the second orifice.

BRIEF DESCRIPTION OF THE DRAWINGS

The invention will now be described, by way of example, with reference to the accompanying drawing, in which.

DESCRIPTION OF THE PREFERRED EMBODIMENTS

Figure 1:
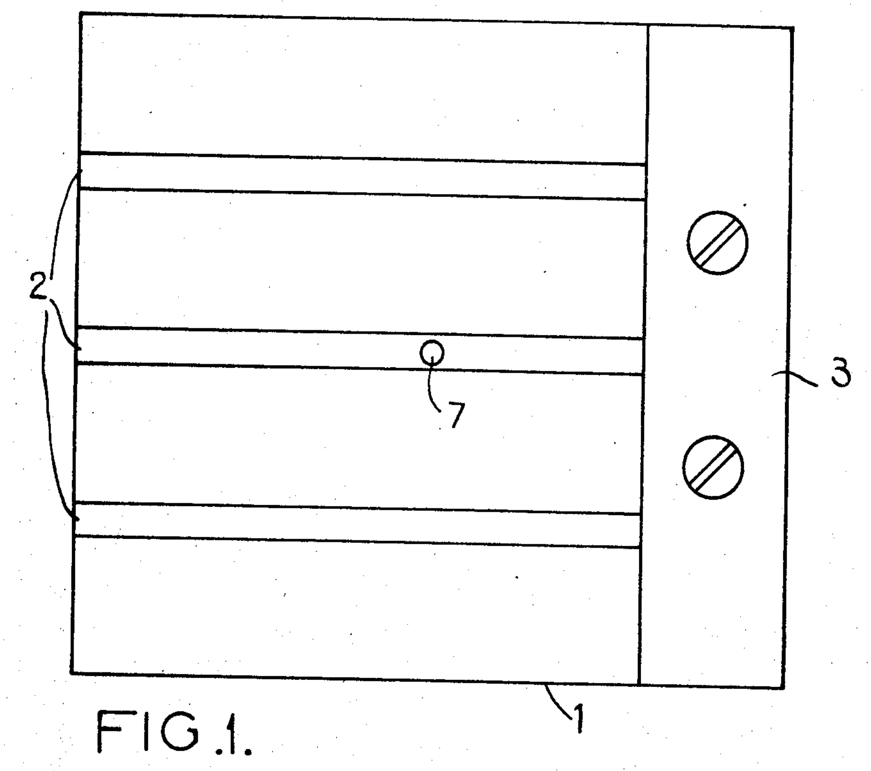
FIG. 1 is a schematic plan view of document support plate.

A document support plate 1 (FIGS. 1 and 2) is provided with three shallow slots 2. One end of each slot 2 is open at the edge of the plate and the other end is closed by a cover plate 3 which is recessed into the plate 1 so that the top of the assembly provides a smooth document supporting surface.

The plate 1 is grooved below the plate 3 to form a small chamber 4 which abuts the closed ends of the slots and communicates with an inlet tube 5.

The under surface of the plate 3 is grooved in alignment with each of the slots, so that a narrow slit-like orifice is formed between the edge of the plate 3 and the bottom of each slot. The application of air, or other gas, under pressure to the tube 5 from a source 6 causes a jet to issue from each slit orifice and to travel along each slot. A document (not shown) may be moved from right to left, as seen in FIG. 1, over the plate 3, by conventional document feeding rollers (not shown) in FIGS. 1 and 2 but shown in FIG. 4. With the correct rate of airflow into the slots 2, the air stream exerts a force on the document to pull it towards the surface of the feed plate and thereby to provide a frictional restraining force.

Intermediate between the open and closed ends of the central slot is a further orifice 7 which communicates with a tube 8. A pressure sensitive transducer 9, such as a pressure responsive transistor, is mounted in the lower end of the tube 8. An electrical connection 10 is made from the pressure transducer to a Schmitt trigger 11. The unimpeded air flow along the slot produces a particular value of pressure and a corresponding signal input to the trigger 11. The presence of any part of the document above the orifice 7 produces a decrease in the pressure in this part of the slot. This decrease produces a corresponding decrease in the signal input to the trigger 11, which is set so that it changes state in response to the decrease. Hence, the voltage on output line 12 has one value in the absence of a document above the orifice 7 and a different value in the presence of a document.

It will be understood that other pressure sensitive devices may be used instead of the transistor. For example, the tube 7 may contain a resilient diaphragm, the deflection of which under the decreased pressure directly completes an electrical circuit to the output line 12.

Figure 3:
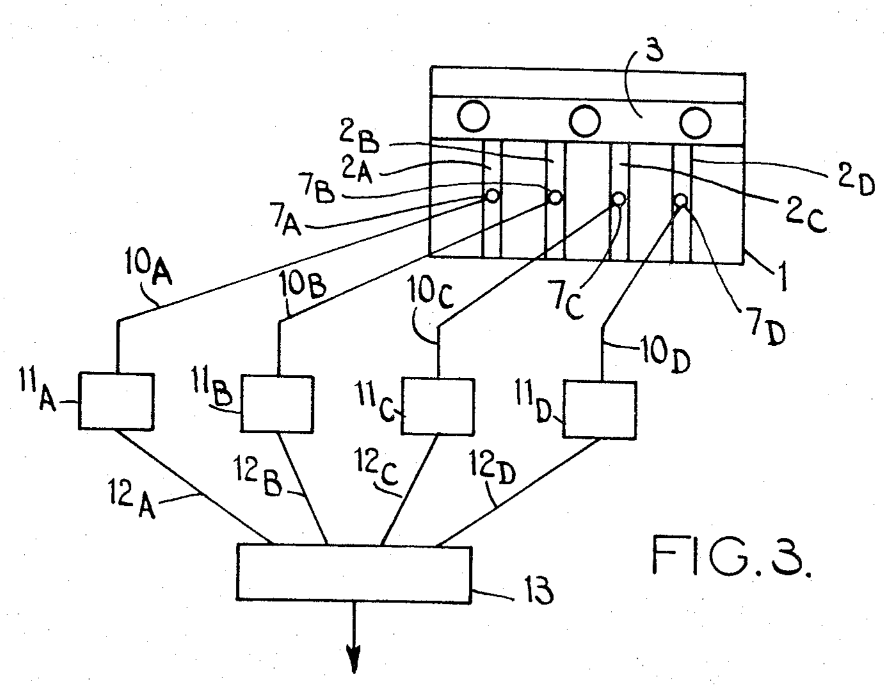
FIG. 3 is a schematic view of a modified form of the document detection apparatus.

The plate 1 has been shown as having three slots. It will be appreciated that a greater, or lesser, number of slots may be used, depending upon the size, stiffness and weight of the documents which are to be fed. Similarly, the number of document detection systems may be varied. For example, a detection system in each slot arranged along a line transverse to the direction of feeding will generate a group of signals each of which will indicate when the leading edge of the document has reached the detector. This is shown in FIG. 3 in which the slots are identified as 2A, 2B, 2C and 2D; and the outlet orifices as 7A, 7B, 7C and 7D. The outputs from the elements associated with the slots 2A, 2B, 2C and 2D, one respectively are fed by way of electrical connections 10A, 10B, 10C and 10D to associated trigger circuits 11A, 11B, 11C, and 11D. The outputs 12A, 12B, 12C and 12D are combined in conventional coincidence detection circuitry 13 to determine whether or not the leading edge of the document is skewed relative to the line of detection devices.

Figure 2:
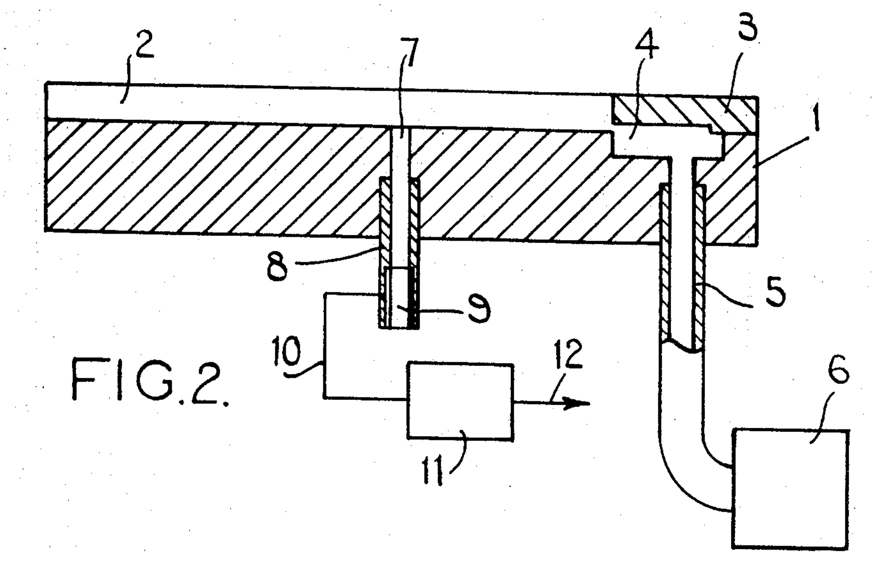
FIG. 2 is a schematic view of the plate, showing a document detection system.
Figure 4:
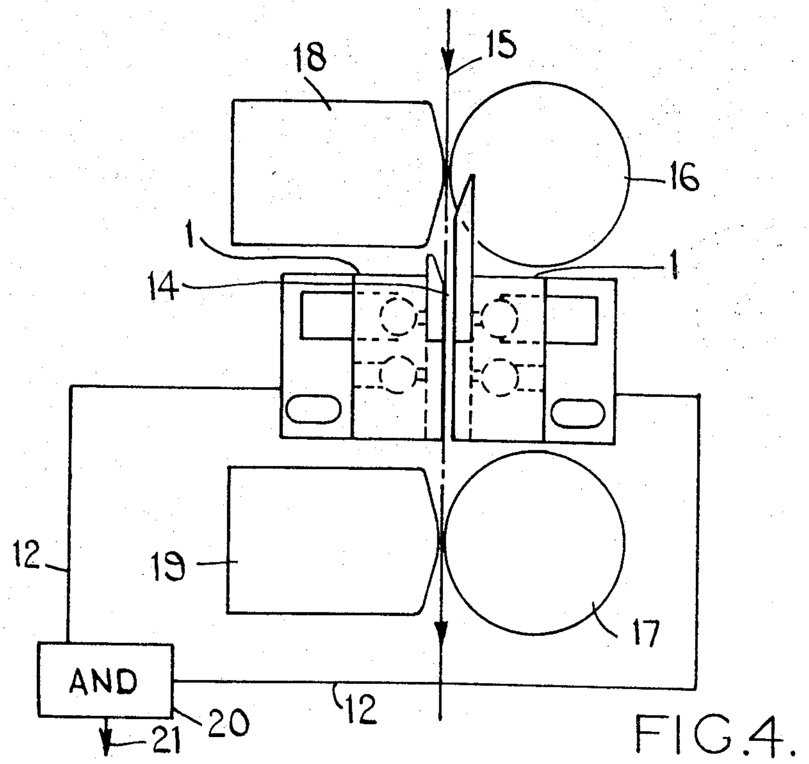
FIG. 4 is a schematic view of apparatus for detecting overlapping documents.

Referring now to FIG. 4 two sets of the apparatus shown in FIGS. 1 and 2 are so arranged that the document support plates 1 are arranged face to face with a small separation 14 between them to form a doubles detector. The separation 14 is positioned to intercept the path of the documents as is indicated by the line 15. The documents (not shown) are fed through the separation by drive rolls 16, 17 co-opending respectively with a document writing head 18 and a reading head 19.

A single document (not shown) which is fed between the pair of plates will be pulled down on to one plate 1 and will operate the detection system for that plate, but the detection system for the other plate will not be operated. However, if an error in feeding causes two documents to be fed between the plates 1, one document will be pulled on to each plate and both detection systems will be operated. The signals from the detection systems are combined in an AND gate 20 so that an output signal 21 from the gate may be used to provide a feed error indication, or to prevent further feeding of one of the documents, for example.

I claim:

1. Apparatus for detecting a document including a support plate with a smooth document supporting surface; at least one linear slot in the surface of the plate, the slot being aligned in the direction of document feed and being closed at one end and open at the other end; a first orifice adjacent to the closed end of the slot such that the application of pressurised gas to the orifice causes a stream of gas to flow along the slot; a second orifice in the slot intermediate the closed and open ends; a pressure detection means responsive to the gas pressure at the second orifice; and means controlled by said detection means to provide an indication of the presence of a document on the plate and over the second orifice.

2. Apparatus as claimed in claim 1, wherein one end of each said slot is open at one edge of the plate and is closed at its other end by a cover plate which is recessed into the plate to maintain said smooth supporting surface; and wherein the plate is grooved beneath the cover plate thereby to provide a chamber which abuts the closed end of each said slot and also communicate with a gas inlet tube.

3. Apparatus as claimed in claim 2, wherein the under surface of the cover plate is grooved in alignment with each of said slots whereby a slit like orifice is formed between the edge of the plate and the bottom of each slot.

4. Apparatus as claimed in claim 2, wherein the pressure detection means is a pressure responsive transducer in operational communication with the second orifice, and wherein the indication producing means includes a trigger circuit arranged to change its switching state in response to a change in pressure in the slot or slots.

5. Apparatus as claimed in claim 2 wherein the gas flow in the slot is of such a rate as to exert a force on the document towards the surface of the support plate and thereby provide a frictional restraining force, on the document.

6. Apparatus as claimed in claim 2, and including a pressure detection means in each said slot, the detection means being arranged along a line transverse to the direction of feeding, the arrangement being such as to generate a group of signals each of such signals serving to indicate when the leading edge of the document has reached the associated detector.

7. Apparatus as claimed in claim 1, and including a signal coincidence detector to determine whether or not the leading edge of the document is skewed relative to the line of detection means.

8. Apparatus for detecting the presence of two overlapping documents; including first and second plates each having a smooth document contacting surface disposed to define a guide way for the passage of documents therebetween; means for feeding documents through said guideway; each said plate having on its document contacting surface at least one line or slot aligned with the direction of document feed through the guideway and open at one end and closed at the other end, a first orifice adjacent the slot closed end such that application of pressure gas to the first orifice causes a stream of gas to flow along the slot, and a second orifice intermediate the closed and open ends; means for producing a gas flow in said slots at such a rate as to exert a force on a document towards the surface of the plate and thereby provide a frictional restraining force on the document; first gas pressure detection means responsive to gas pressure at the second orifice of the first plate; first means controlled by the first gas pressure detection means for producing an indication of the presence of a document at the first plate; second gas pressure detection means responsive to gas pressure at the second orifice of the second plate; second means controlled by the second gas pressure detection means for producing an indication of the presence of a document at the second plate; and means responsive to the simultaneous receipt of a said indication from the first and second gas pressure detection means to indicate the presence of overlapping documents in said guideway.

* * * * *